United States Patent
An et al.

(10) Patent No.: US 12,454,317 B2
(45) Date of Patent: Oct. 28, 2025

(54) FRONT BODY STRUCTURE

(71) Applicants: HYUNDAI MOTOR COMPANY, Seoul (KR); Kia Corporation, Seoul (KR)

(72) Inventors: Byeongdo An, Anyang-si (KR); Heeju Kim, Yongin-si (KR)

(73) Assignees: HYUNDAI MOTOR COMPANY, Seoul (KR); Kia Corporation, Seoul (KR)

(*) Notice: Subject to any disclaimer, the term of this patent is extended or adjusted under 35 U.S.C. 154(b) by 343 days.

(21) Appl. No.: 17/883,136

(22) Filed: Aug. 8, 2022

(65) Prior Publication Data

US 2023/0040325 A1     Feb. 9, 2023

(30) Foreign Application Priority Data

Aug. 9, 2021 (KR) .......................... 10-2021-0104433

(51) Int. Cl.
| | |
|---|---|
| *B62D 25/08* | (2006.01) |
| *B62D 27/02* | (2006.01) |
| *B62D 27/06* | (2006.01) |
| *B62D 29/00* | (2006.01) |

(52) U.S. Cl.
CPC ............ *B62D 25/08* (2013.01); *B62D 27/02* (2013.01); *B62D 27/065* (2013.01); *B62D 29/008* (2013.01)

(58) Field of Classification Search
CPC ...... B62D 25/08; B62D 27/02; B62D 29/008; B62D 27/023; B62D 27/065

USPC ......................... 296/187.09, 203.02; 293/133
See application file for complete search history.

(56) References Cited

U.S. PATENT DOCUMENTS

| | | | |
|---|---|---|---|
| 6,273,486 B1 * | 8/2001 | Ezzat | B62D 27/00 |
| | | | 296/203.02 |
| 9,764,705 B2 * | 9/2017 | Murata | B60R 19/34 |
| 10,589,789 B2 * | 3/2020 | Sekiya | B60R 19/34 |
| 11,014,612 B2 * | 5/2021 | Chung | B62D 25/084 |
| 11,198,473 B2 * | 12/2021 | Okamoto | B62D 21/11 |
| 11,993,316 B2 * | 5/2024 | Hong | B62D 25/2018 |
| 2014/0159411 A1 * | 6/2014 | Kim | B62D 27/065 |
| | | | 296/29 |
| 2016/0121829 A1 | 5/2016 | Murata et al. | |
| 2017/0113727 A1 * | 4/2017 | Nakamoto | B60R 19/34 |
| 2020/0047696 A1 * | 2/2020 | Atsumi | B62D 25/084 |

(Continued)

FOREIGN PATENT DOCUMENTS

KR         20130076488 A  *  7/2013

*Primary Examiner* — Dennis H Pedder
(74) *Attorney, Agent, or Firm* — MORGAN, LEWIS & BOCKIUS LLP

(57) ABSTRACT

A front body structure for mounting front structure parts including a front back beam unit, a sub-frame, and a fender apron upper member thereon includes: front side members provided on left and right sides, respectively, in a width direction of a vehicle body while extending in a longitudinal direction of the vehicle body, each front side member being manufactured of an aluminum extrusion member; and mounting units coupled to front portions of the front side members, respectively, to mount the front structure parts thereon, each mounting unit being made of an aluminum material, wherein the mounting units form a plurality of load paths connected to the front side members through a plurality of reinforcing ribs outside the front side members.

17 Claims, 18 Drawing Sheets

(56) References Cited

U.S. PATENT DOCUMENTS

2023/0339546 A1* 10/2023 Park .................. B62D 25/2018
2023/0391405 A1* 12/2023 Yang .................. B62D 25/2036

* cited by examiner

FRONT BODY STRUCTURE

CROSS-REFERENCE TO RELATED APPLICATION

The present application claims priority to Korean Patent Application No. 10-2021-0104433 filed on Aug. 9, 2021, the entire contents of which is incorporated herein for all purposes by this reference.

BACKGROUND OF THE PRESENT DISCLOSURE

Field of the Present Disclosure

The present disclosure relates to a front body structure of a vehicle. More particularly, the present disclosure relates to a front body structure of a vehicle configured to mount front structure parts thereon.

Description of Related Art

In general, a front body of a vehicle includes front side members provided on left and right sides, respectively, in a width direction of the vehicle while extending in a longitudinal direction of the vehicle.

Front structure parts such as a front back beam unit, a sub-frame, and a fender apron upper member are mounted in a front portion of each of the front side members through mounting brackets.

In a conventional steel body of a vehicle, body parts such as the front side members and the mounting brackets are individually manufactured by a press method, and then coupled to each other by welding, bolting, or the like. However, such a body structure of a vehicle has a low degree of freedom in designing body parts due to the characteristics of the press method, resulting in increases in not only the number of parts for structural reinforcement but also manufacturing cost and weight, and there has been a limit in increasing coupling strength between the body parts.

Meanwhile, to improve fuel efficiency, methods for manufacturing body parts using light-weight materials rather than steel and connecting the body parts to each other have recently been proposed. For example, methods for manufacturing body parts by extruding or casting light-weight aluminum and combining the body parts with each other have been proposed.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a front body structure of a vehicle having advantages of reducing the number of parts, reducing a manufacturing cost and a weight, increasing skeletal rigidity of the front body, and improving front crashworthiness.

Various aspects of the present disclosure are directed to providing a front body structure of a vehicle for mounting front structure parts including a front back beam unit, a sub-frame, and a fender apron upper member thereon, the front body structure including: i) front side members provided on left and right sides, respectively, in a width direction of a vehicle body while extending in a longitudinal direction of the vehicle body, each front side member being manufactured of an aluminum extrusion member; and ii) mounting units coupled to front portions of the front side members, respectively, to mount the front structure parts thereon, each mounting unit being made of an aluminum material, wherein the mounting units form a plurality of load paths connected to the front side members through a plurality of reinforcing ribs outside the front side members.

In the front body structure according to various exemplary embodiments of the present disclosure, each of the mounting units may include a rib reinforcing portion including the plurality of reinforcing ribs; and a front coupling portion integrally formed on a front portion of the rib reinforcing portion and coupled to a front end portion of each of the front side members.

In the front body structure according to various exemplary embodiments of the present disclosure, each of the mounting units may further include a rear coupling portion connected to a rear portion of the rib reinforcing portion, and inserted and coupled into an external side surface of each of the front side members at the front portions of the front side members inwardly in the width direction of the vehicle body.

In the front body structure according to various exemplary embodiments of the present disclosure, each of the mounting units may further include: a first coupling rib portion formed in a horizontal direction to integrally connect the rear coupling portion, the rib reinforcing portion, and the front coupling portion to one another along the longitudinal direction of the vehicle body; and a second coupling rib portion extending upwardly from the first coupling rib portion to integrally connect the rear coupling portion and the rib reinforcing portion corresponding to each other along the longitudinal direction of the vehicle body.

In the front body structure according to various exemplary embodiments of the present disclosure, each of the mounting units may further include: a first fastening portion formed on a lower surface of the first coupling rib portion to fasten the sub-frame thereto; and at least one second fastening portion formed on a lower surface of the rib reinforcing portion to fasten the sub-frame thereto at a more outward position than the first fastening portion.

In the front body structure according to various exemplary embodiments of the present disclosure, the rear coupling portion may include at least one first box body formed in a shape of a box extending inwardly in the width direction of the vehicle body from the second coupling rib portion.

In the front body structure according to various exemplary embodiments of the present disclosure, the at least one first box body may be inserted into an insertion hole formed in the external side surface of each of the front side members, and provided on a central side of the inside of each of the front side members.

In the front body structure according to various exemplary embodiments of the present disclosure, a first box space open on a side of the second coupling rib portion may be formed inside the at least one first box body.

In the front body structure according to various exemplary embodiments of the present disclosure, the at least one first box body may be integrally connected to an upper surface of the first coupling rib portion through a connection box body open on the second coupling rib portion side thereof.

In the front body structure according to various exemplary embodiments of the present disclosure, a second box space connected to the first box space may be formed inside the connection box body.

In the front body structure according to various exemplary embodiments of the present disclosure, at least one first internal rib extending vertically from the upper surface of the first coupling rib portion may be formed in the first box space and the second box space connected to each other.

In the front body structure according to various exemplary embodiments of the present disclosure, the first coupling rib portion may be screw-coupled to a lower surface of each of the front side members.

In the front body structure according to various exemplary embodiments of the present disclosure, the second coupling rib portion may be screw-coupled to the external side surface of each of the front side members.

In the front body structure according to various exemplary embodiments of the present disclosure, the at least one first box body may be screw-coupled to an internal side surface of each of the front side members.

In the front body structure according to various exemplary embodiments of the present disclosure, the rib reinforcing portion may be provided outwardly in the width direction of the vehicle body to be offset with respect to the center of the inside of each of the front side members.

In the front body structure according to various exemplary embodiments of the present disclosure, the rib reinforcing portion may include a plurality of reinforcing ribs.

In the front body structure according to various exemplary embodiments of the present disclosure, the plurality of reinforcing ribs may include: a plurality of first reinforcing ribs extending along the longitudinal direction of the vehicle body; and a plurality of second reinforcing ribs extending in the up and down direction of the vehicle body to connect the plurality of first reinforcing ribs to each other.

In the front body structure according to various exemplary embodiments of the present disclosure, a member mounting portion configured to couple a front portion of the fender apron upper member thereto may be provided in upper portions of the rib reinforcing portion and the front coupling portion connected to each other.

In the front body structure according to various exemplary embodiments of the present disclosure, the member mounting portion may include: a member mounting surface provided at the upper portion of the rib reinforcing portion; a first coupling flange extending upwardly from an external edge portion of the member mounting surface in the width direction of the vehicle body; a second coupling flange provided at the upper portion of the front coupling portion and connected to a front edge portion of the member mounting surface; and a rib surface extending downwardly from a rear edge portion of the member mounting surface.

In the front body structure according to various exemplary embodiments of the present disclosure, the first fastening portion may include: a second box body including a third box space open on the second coupling rib portion side; and a first pipe nut integrally formed at the second box body.

In the front body structure according to various exemplary embodiments of the present disclosure, the first fastening portion may further include at least one second internal rib vertically connected to the lower surface of the first coupling rib portion in the third box space.

In the front body structure according to various exemplary embodiments of the present disclosure, the second fastening portion may include a second pipe nut integrally formed on the lower surface of the rib reinforcing portion including the plurality of reinforcing ribs.

In the front body structure according to various exemplary embodiments of the present disclosure, a virtual vertical center line of the rib reinforcing portion along an up and down direction of the second pipe nut may be provided to be offset at an outward position in the width direction of the vehicle body with respect to a virtual vertical center line of the front coupling portion.

In the front body structure according to various exemplary embodiments of the present disclosure, the front coupling portion may be coupled to a front upper end portion of each of the front side members through a first mounting bracket, and coupled to a front internal end portion of each of the front side members through a second mounting bracket.

In the front body structure according to various exemplary embodiments of the present disclosure, a plurality of third pipe nuts may be coupled to the front coupling portion to fasten the front back beam unit thereto.

According to the exemplary embodiments of the present disclosure, it is possible to reduce the number of parts, reduce a manufacturing cost and a weight, increase skeletal rigidity of the front body of the vehicle, and improve front crashworthiness.

Other effects which may be obtained or predicted from the exemplary embodiments of the present disclosure will be disclosed directly or implicitly in the detailed description of the exemplary embodiments of the present disclosure. That is, various effects predicted from the exemplary embodiments of the present disclosure will be disclosed in the following detailed description.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
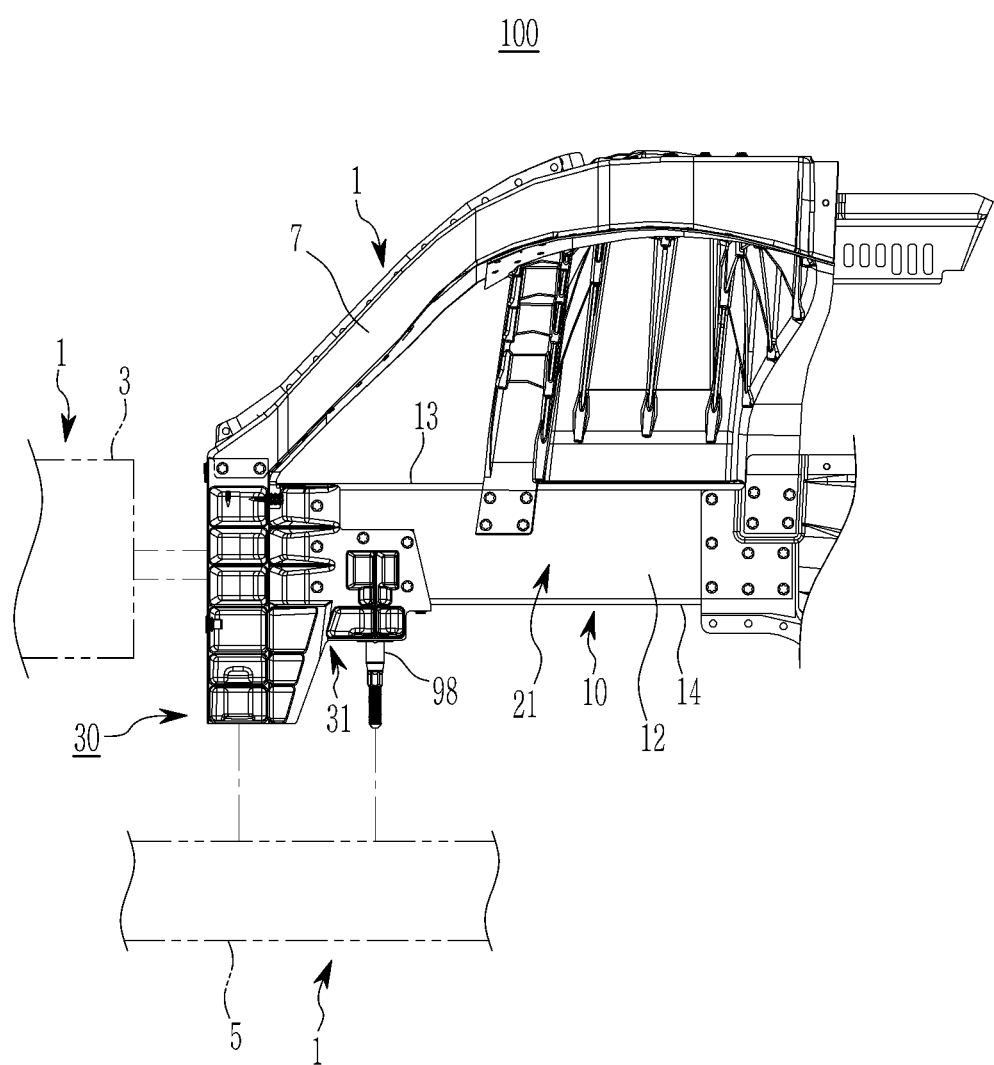
FIG. 1 is a side view exemplarily illustrating a front body structure of a vehicle according to various exemplary embodiments of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

The terminology used herein is for describing particular exemplary embodiments and is not intended to limit the present disclosure. As used herein, singular forms are intended to include plural forms as well, unless the context clearly indicates otherwise. It will be further understood that the terms "comprises" and/or "comprising," when used herein, specify the presence of stated features, integers, steps, operations, components, and/or combinations thereof, but do not preclude the presence or addition of one or more other features, integers, steps, operations, components, and/or combinations thereof. As used herein, the term "and/or" includes any or all combinations of one or more of the associated listed items. The term "coupled" herein denotes a physical relationship between two components whereby the components are directly connected to each other by welding, a self piercing rivet (SPR), a flow drill screw (FDS), a structural adhesive, or the like, or indirectly connected to each other via or more intermediary components.

It is to be understood that the term "vehicle," "vehicular," "car," or another similar term as used herein is inclusive of motor vehicles, in general, such as passenger vehicles including sports utility vehicles (SUV), buses, trucks, various commercial vehicles, and the like, and includes hybrid vehicles, electric vehicles, hybrid electric vehicles, hydrogen-powered vehicles and other alternative fuel vehicles (e.g., fuels derived from resources other than petroleum).

Hereinafter, various exemplary embodiments of the present disclosure will be described in detail with reference to the accompanying drawings.

Figure 2:
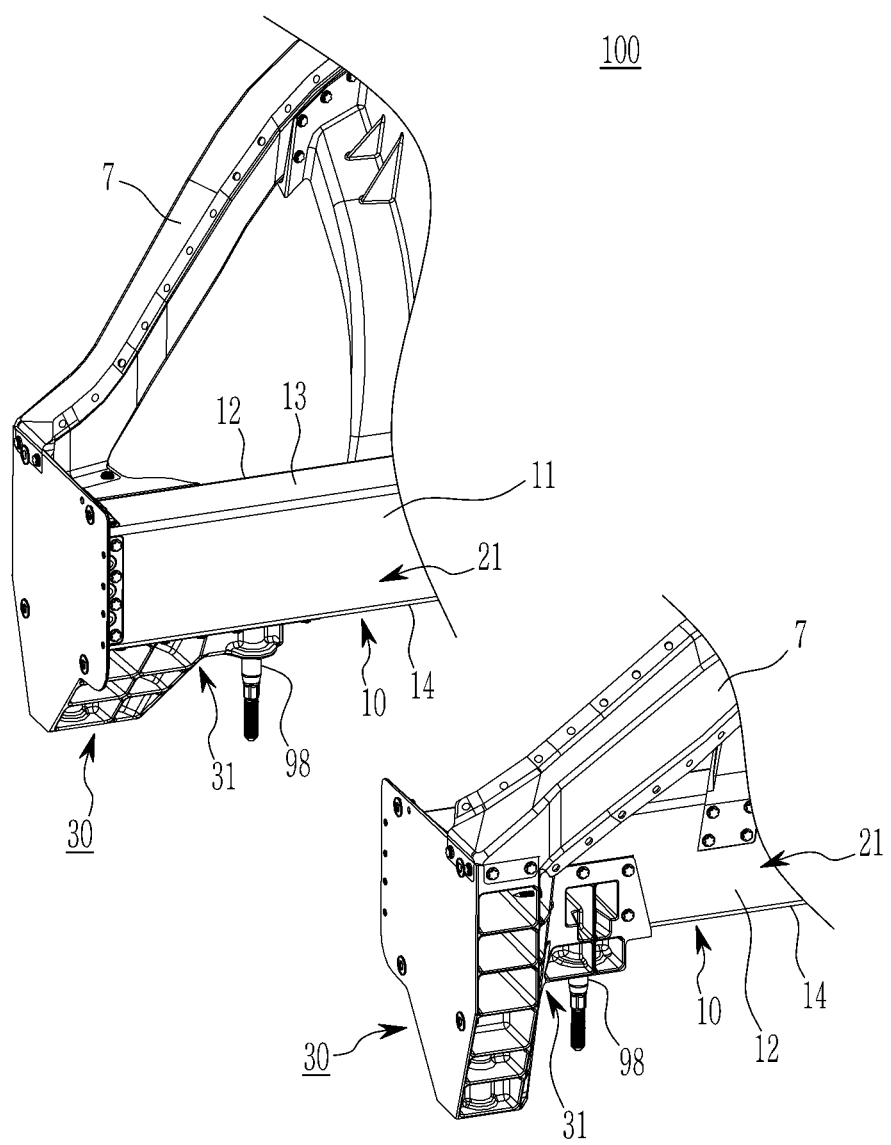
FIG. 2 is an assembled perspective view exemplarily illustrating the front body structure according to various exemplary embodiments of the present disclosure.
Figure 3:
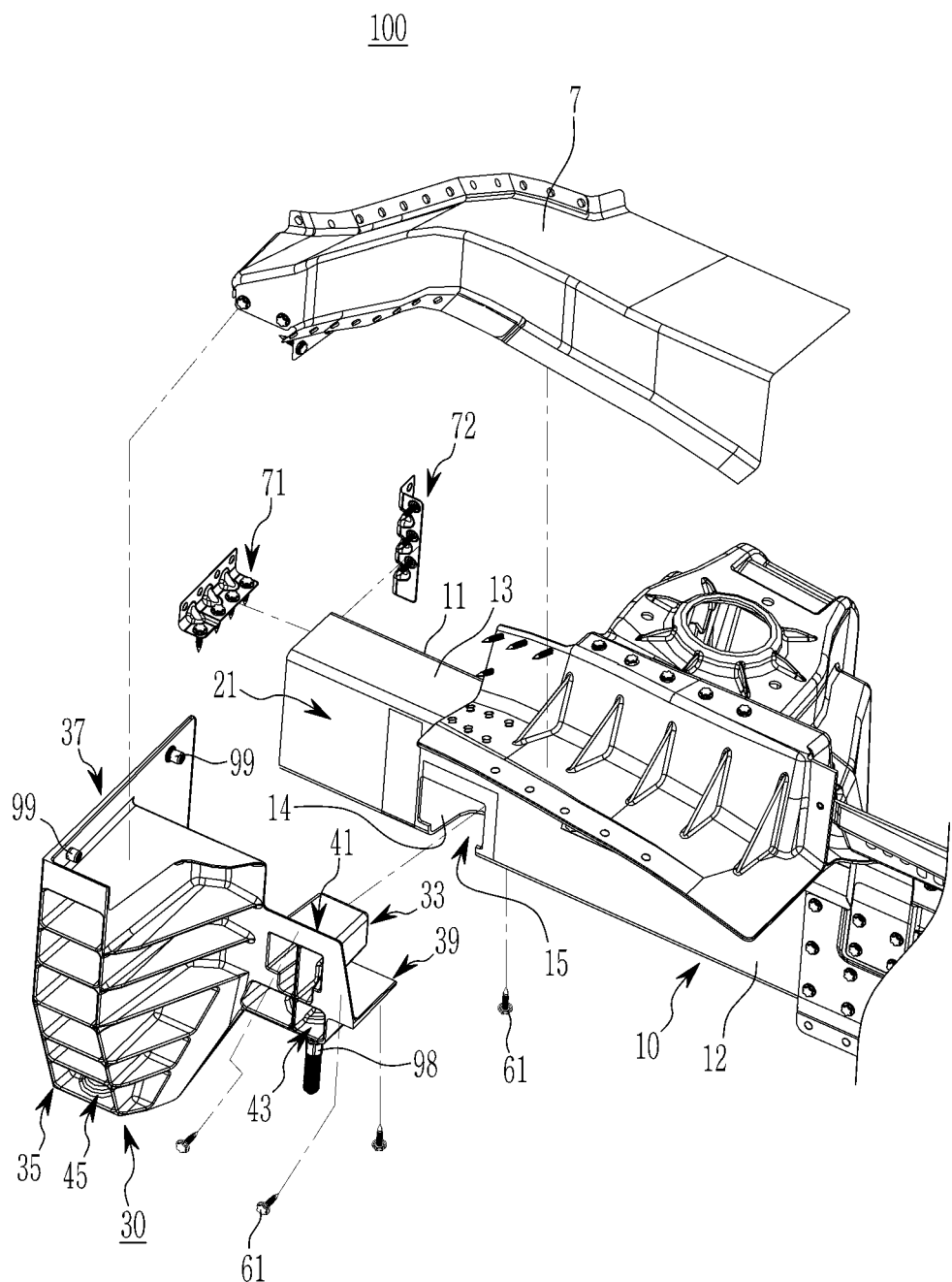
FIG. 3 and FIG. 4 are exploded perspective views each illustrating the front body structure according to various exemplary embodiments of the present disclosure.
Figure 4:
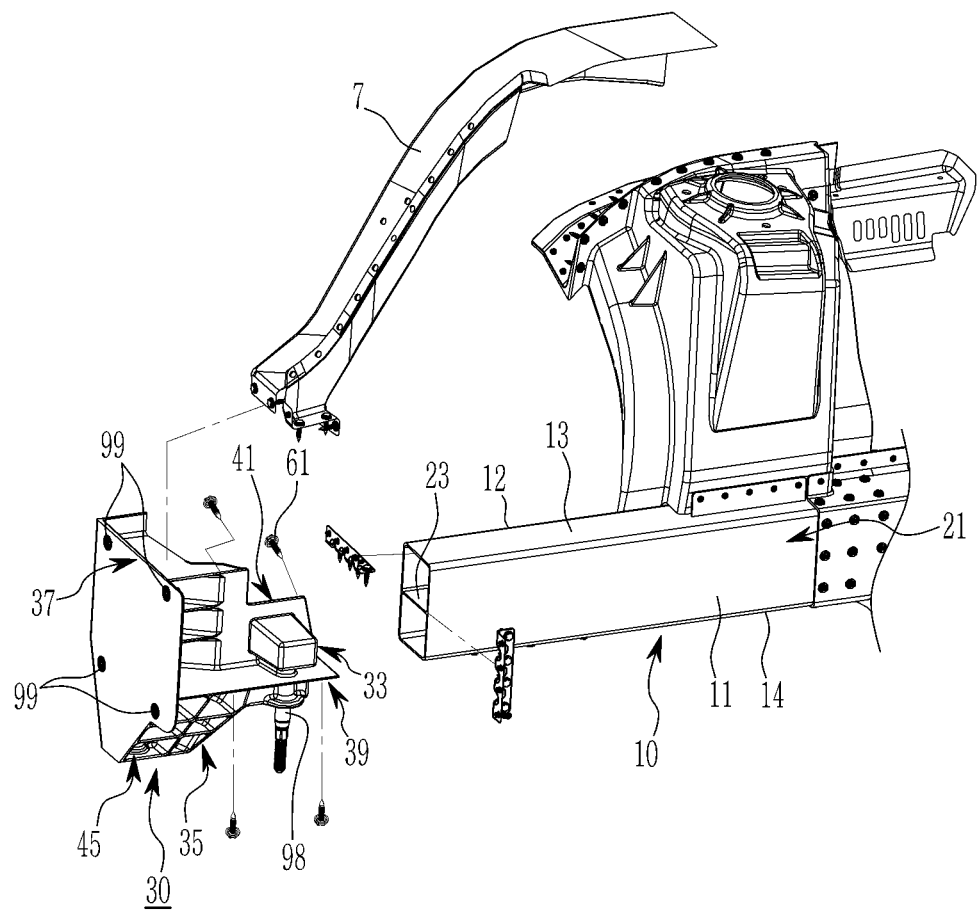

FIG. 1 is a side view exemplarily illustrating a front body structure according to various exemplary embodiments of the present disclosure, FIG. 2 is an assembled perspective view exemplarily illustrating the front body structure according to various exemplary embodiments of the present disclosure, and FIG. 3 and FIG. 4 are exploded perspective views each illustrating the front body structure according to various exemplary embodiments of the present disclosure.

Referring to FIG. 1, FIG. 2, FIG. 3, and FIG. 4, the front body structure 100 according to various exemplary embodiments of the present disclosure may be applied to a front structure body of a vehicle configured to mount various front structure parts 1 thereon.

Here, the front structure parts 1 may include a front back beam unit 3, a front end module (FEM) carrier, a sub-frame 5, and a fender apron upper member 7.

In the exemplary embodiment, a 'front and rear direction of the vehicle body' may be defined as a longitudinal direction of the vehicle body, a 'width direction of the vehicle body' may be defined as a left and right direction of the vehicle body, and an 'up and down direction of the vehicle body' may be defined as a height direction of the vehicle body.

Furthermore, in the exemplary embodiment, an 'inward side in the width direction of the vehicle body' may be defined as an internal region between components facing each other while being spaced from each other, and an 'outward side in the width direction of the vehicle body' may be defined as an external region between the components.

Furthermore, in the exemplary embodiment, an 'upper end portion', 'upper portion', 'upper end' or 'upper surface' of a component indicates an end portion, portion, end, or surface of the component which is located on a relatively upper side in the drawings, and a 'lower end portion', 'lower portion', 'lower end' or 'lower surface' of a component indicates an end portion, portion, end, or surface of the component which is located on a relatively lower side in the drawings.

Furthermore, in the exemplary embodiment, an end portion of a component (e.g., one end portion or the opposite end) indicates an end portion of the component in any one direction, and an end portion of a component (e.g., one end portion or the opposite end portion) indicates a predetermined portion of the component including an end portion thereof.

The front body structure 100 according to various exemplary embodiments of the present disclosure may be a structure configured for reducing the number of parts, reducing its manufacturing cost and weight, effectively supporting front structure parts, increasing skeletal rigidity of the front body, and improving front crashworthiness.

To the present end, the front body structure 100 according to various exemplary embodiments of the present disclosure may include front side members 10 provided both sides of vehicle and mounting units 30 coupled to the front side members 10, respectively.

In various exemplary embodiments of the present disclosure, the front side members 10 are provided on left and right sides, respectively, in the width direction of the vehicle body while extending in the front and rear direction of the vehicle body.

As an exemplary embodiment of the present disclosure, each of the front side members 10 may be formed in a rectangular box shape. Each of the front side members 10 includes an internal side surface 11 and an external side surface 12 in the width direction of the vehicle body, and an upper surface 13 and a lower surface 14 in the up and down direction of the vehicle body.

As an exemplary embodiment of the present disclosure, each of the front side members 10 may be manufactured by an aluminum extrusion method. Each of the front side members 10 may be manufactured of an aluminum extrusion member 21 including a rectangular box shape.

As an exemplary embodiment of the present disclosure, at least one transverse partition wall 23 configured to increase the structural rigidity of each of the front side members 10 may be provided inside the rectangular box shape.

In various exemplary embodiments of the present disclosure, the mounting units 30 are configured to mount the front structure parts 1 thereon as mentioned above. The mounting units 30 are configured to transmit a load (e.g., a front collision load) input from a front portion of the vehicle body through the front back beam units 3 to the fender apron upper members 7 and the front side members 10, respectively. Furthermore, the mounting units 30 are configured to effectively support the front back beam units 3 and the sub-frames 5. These mounting units 30 are coupled to front portions of the front side members 10, respectively.

As an exemplary embodiment of the present disclosure, each of the mounting units 30 is manufactured of an aluminum material. Furthermore, each of the mounting units 30 may be manufactured by an aluminum die casting method. Furthermore, each of the mounting units 30 may be manufactured of an aluminum die casting member 31 (see FIG. 1 and FIG. 2) as a single structure body to which the front structure parts 1 may be mounted.

Hereinafter, the mounting unit 30 applied to the front body structure 100 according to various exemplary embodiments of the present disclosure will be described in detail with reference to the accompanying drawings as well as FIG. 1, FIG. 2, FIG. 3, and FIG. 4.

Figure 5:
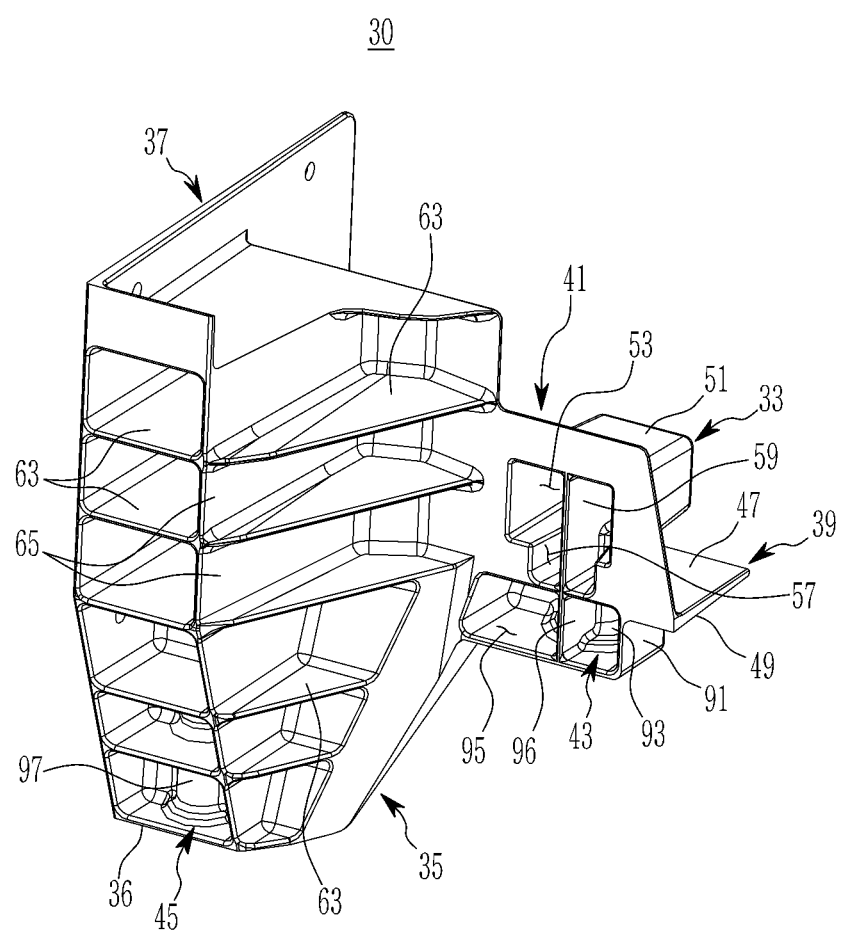
FIG. 5 and FIG. 6 are perspective views each illustrating a mounting unit applied to the front body structure according to various exemplary embodiments of the present disclosure.
Figure 6:
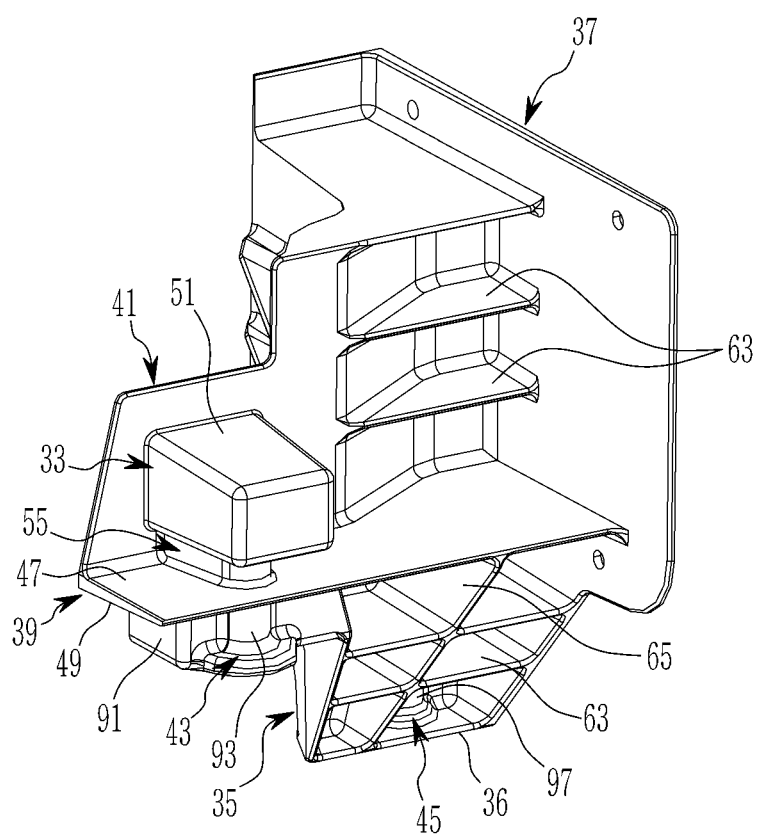
Figure 7:
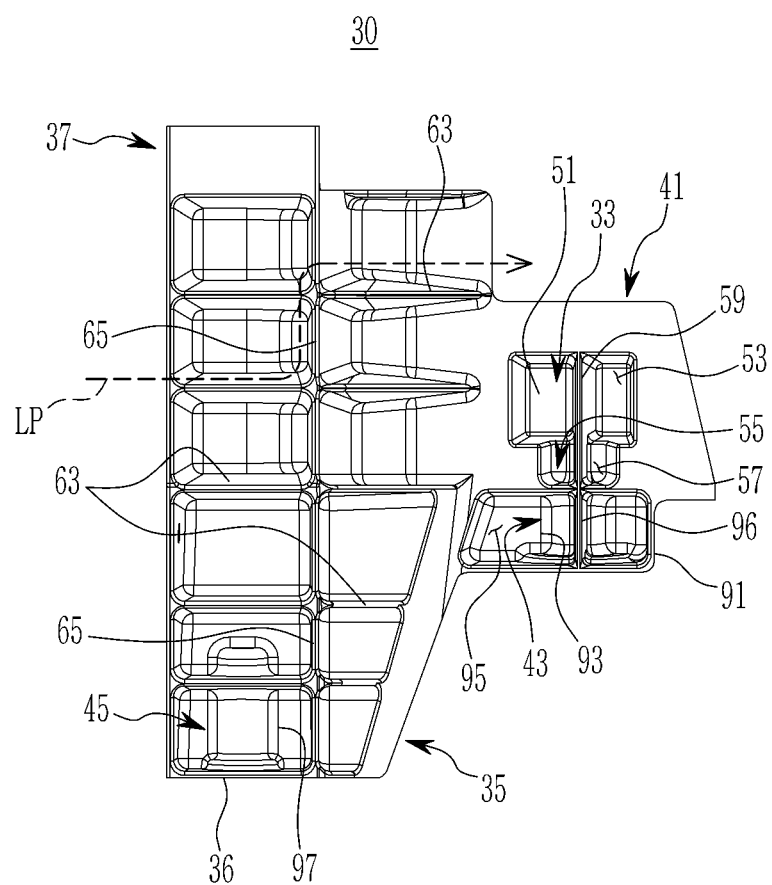
FIG. 7 is a front view exemplarily illustrating the mounting unit applied to the front body structure according to various exemplary embodiments of the present disclosure.
Figure 8:
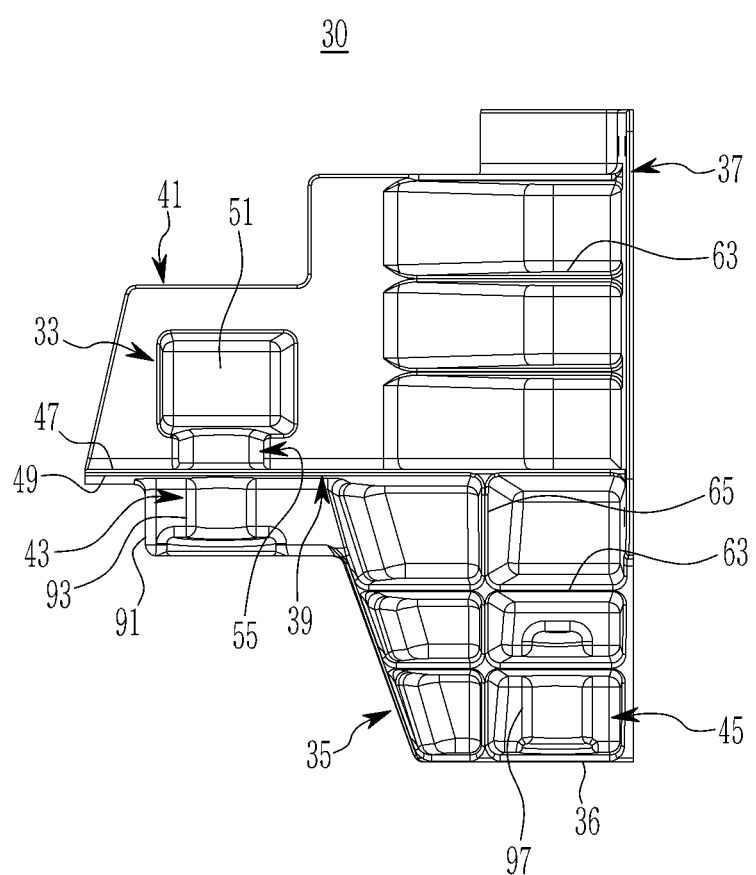
FIG. 8 is a rear view exemplarily illustrating the mounting unit applied to the front body structure according to various exemplary embodiments of the present disclosure.
Figure 9:
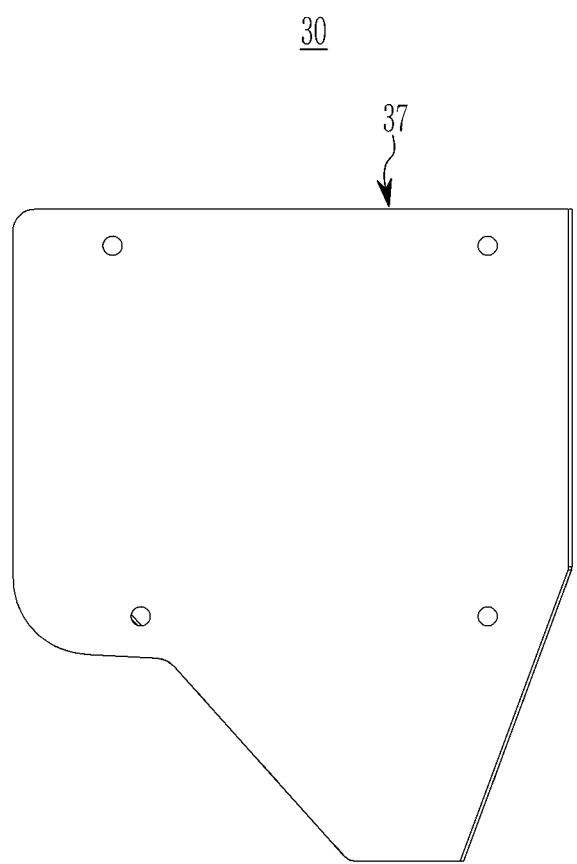
FIG. 9 is a left side view exemplarily illustrating the mounting unit applied to the front body structure according to various exemplary embodiments of the present disclosure.
Figure 10:
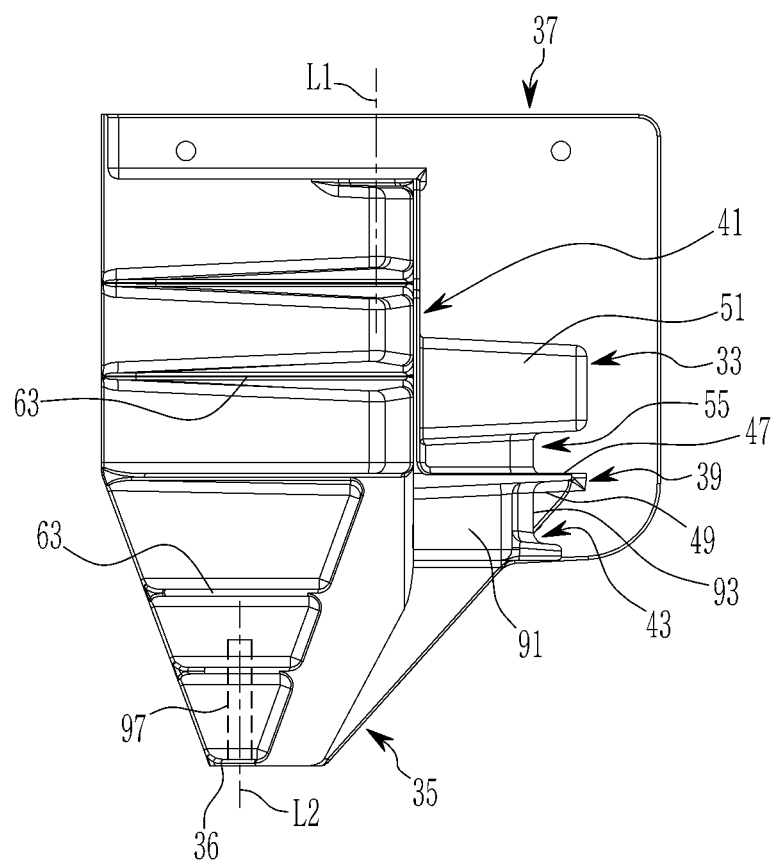
FIG. 10 is a right side view exemplarily illustrating the mounting unit applied to the front body structure according to various exemplary embodiments of the present disclosure.
Figure 11:
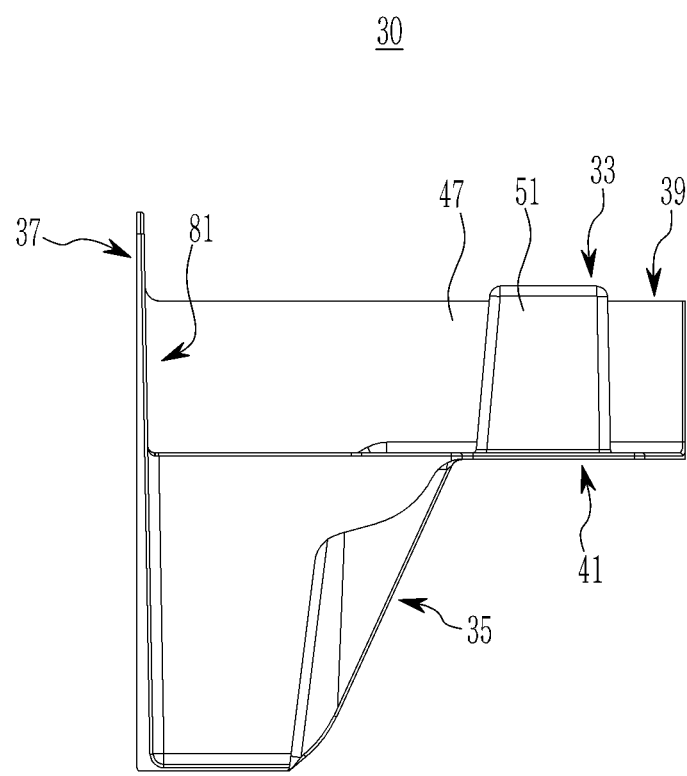
FIG. 11 is a plan view exemplarily illustrating the mounting unit applied to the front body structure according to various exemplary embodiments of the present disclosure.

FIG. 5 and FIG. 6 are perspective views each illustrating the mounting unit applied to the front body structure according to various exemplary embodiments of the present disclosure. FIG. 7 is a front view exemplarily illustrating the mounting unit applied to the front body structure according to various exemplary embodiments of the present disclosure. FIG. 8 is a rear view exemplarily illustrating the mounting unit applied to the front body structure according to various exemplary embodiments of the present disclosure. FIG. 9 is a left side view exemplarily illustrating the mounting unit applied to the front body structure according to various exemplary embodiments of the present disclosure. FIG. 10 is a right side view exemplarily illustrating the mounting unit applied to the front body structure according to various exemplary embodiments of the present disclosure. FIG. 11 is a plan view exemplarily illustrating the mounting unit applied to the front body structure according to various exemplary embodiments of the present disclosure.

Referring to FIGS. 1 to 11, the mounting units 30 according to various exemplary embodiments of the present disclosure may form a plurality of load paths LP connected to the front side members 10 through a plurality of reinforcing ribs 63 and 65 (hereinafter, see FIG. 7) outside the front side members 10, respectively.

Each of the mounting units 30 includes a rear coupling portion 33, a rib reinforcing portion 35, a front coupling portion 37, a first coupling rib portion 39, a second coupling rib portion 41, a first fastening portion 43, and a second fastening portion 45.

The rear coupling portion 33 is inserted and coupled into the external side surface 12 of each of the front side members 10 inwardly in the width direction of the vehicle body at the front portion of each of the front side members 10. The rib reinforcing portion 35 extends forwardly from the rear coupling portion 33. That is, the rear coupling portion 33 is connected to a rear portion of the rib reinforcing portion 35. The front coupling portion 37 is integrally formed on a front portion of the rib reinforcing portion 35 and coupled to a front end portion of each of the front side members 10.

The first coupling rib portion 39 is formed in a horizontal direction to integrally connect the rear coupling portion 33, the rib reinforcing portion 35, and the front coupling portion 37 to one another along the front and rear direction of the vehicle body. The first coupling rib portion 39 is provided as a horizontal rib including a predetermined width in the width direction of the vehicle body, and is provided along the front and rear direction of the vehicle body. The first coupling rib portion 39 includes an upper surface 47 and a lower surface 49 in the up and down direction of the vehicle body.

The second coupling rib portion 41 is configured to integrally connect the rear coupling portion 33 and the rib reinforcing portion 35 corresponding to each other along the front and rear direction of the vehicle body. The second coupling rib portion 41 is provided as a vertical rib including a predetermined width in the up and down direction of the vehicle body, extends upwardly from at least one edge portion of the first coupling rib portion 39, and is provided along the front and rear direction of the vehicle body.

The first fastening portion 43 is integrally formed on the lower surface 49 of the first coupling rib portion 39 to fasten a partial section of a front portion of the sub-frame 5 thereto. Furthermore, the second fastening portion 45 is formed on a lower surface 36 of the rib reinforcing portion 35 to fasten the sub-frame 5 thereto at a more outward position than the first fastening portion 43. Also, the second fastening portion 45 is integrally formed on the lower surface 36 of the rib reinforcing portion 35 at a position lower than the first coupling rib portion 39 to fasten the other section of the front portion of the sub-frame 5 thereto.

Hereinafter, the rear coupling portion 33, the rib reinforcing portion 35, the front coupling portion 37, the first fastening portion 43, and the second fastening portion 45 described above will be described in detail based on the first coupling rib portion 39 and the second coupling rib portion 41.

In various exemplary embodiments of the present disclosure, the rear coupling portion 33 includes at least one first box body 51 formed in a shape of a box extending inwardly in the width direction of the vehicle body from the second coupling rib portion 41.

As an exemplary embodiment of the present disclosure, the first box body 51 is provided in a rectangular box shape with a space formed inside.

The first box body 51 is inserted into the inside of each of the front side members 10 inwardly in the width direction of the vehicle body through an insertion hole 15 formed in the external side surface 12 of each of the front side members 10. The first box body 51 is provided on a central side of the inside of each of the front side members 10. Here, the insertion hole 15 is formed at a connection portion between the external side surface 12 and the lower surface 14 of each of the front side members 10.

A first box space 53 open on the second coupling rib portion 41 side is formed inside the first box body 51. The first box space 53 may be formed as a rectangular box space.

Furthermore, the first box body 51 may be integrally connected to an upper surface 47 of the first coupling rib portion 39 through a connection box body 55. The connection box body 55 integrally connects a lower surface of the first box body 51 and the upper surface 47 of the first coupling rib portion 39. A second box space 57 connected to the first box space 53 is formed inside the connection box body 55. The second box space 57 may be formed as a rectangular box space open on the second coupling rib portion 41 side thereof.

Furthermore, at least one first internal rib 59 extending vertically from the upper surface 47 of the first coupling rib portion 39 may be integrally formed in the first box space 53 and the second box space 57 connected to each other. The first internal rib 59 is provided along the width direction of the vehicle body to reinforce the rigidity of the first box body 51 and the connection box body 55.

In the present way, the rear coupling portion 33 may be fastened to each of the front side members 10 by the first coupling rib portion 39 and the second coupling rib portion 41, in a state where the first box body 51 is inserted into the inside of each of the front side members 10 through the insertion hole 15.

Figure 12A:
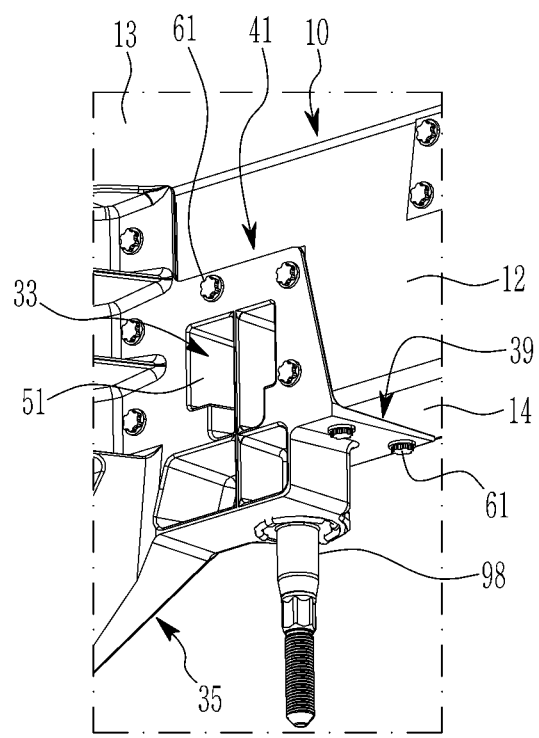
FIG. 12A and FIG. 12B are views exemplarily illustrating a fastening structure between a rear coupling portion and each of front side members applied to the front body structure according to various exemplary embodiments of the present disclosure.
Figure 12B:
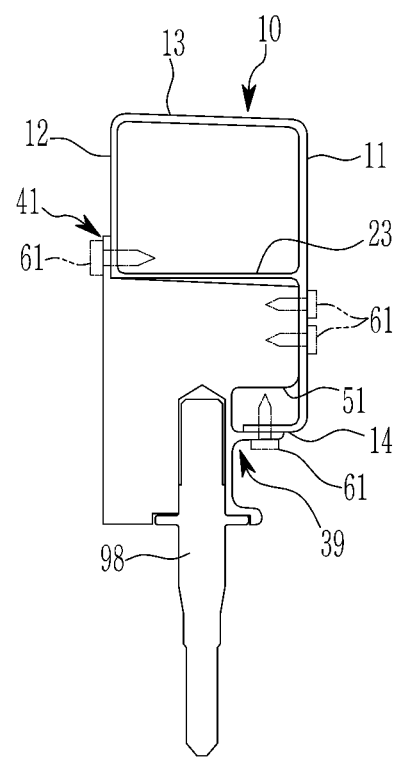

As an exemplary embodiment of the present disclosure, as illustrated in FIG. 12, the first coupling rib portion 39 is screw-coupled to the lower surface 14 of each of the front side members 10 by a plurality of screws 61. The second coupling rib portion 41 is screw-coupled to the external side surface 12 of each of the front side members 10 by a plurality of screws 61. Also, the first box body 51 is screw-coupled to the internal side surface 11 of each of the front side members 10 by a plurality of screws 61. Here, the plurality of screws 61 may be flow drill screws (FDSs) that are well known to those skilled in the art.

Furthermore, the first box body 51 of the rear coupling portion 33 inserted into the inside of each of the front side members 10 through the insertion hole 15 may support a lower surface of the transverse partition wall 23, and minimize the deformation of each of the front side members 10.

In various exemplary embodiments of the present disclosure, the rib reinforcing portion 35 may reinforce the rigidity of each of the mounting units 30, and transmit a collision load input from the front portion of the vehicle body to the fender apron upper member 7 and each of the front side members 10.

The rib reinforcing portion 35 is integrally connected to the rear coupling portion 33 and the front coupling portion 37. The rib reinforcing portion 35 is provided outwardly in the width direction of the vehicle body to be offset by the rear coupling portion 33 with respect to the center of the inside of each of the front side members 10.

The rib reinforcing portion 35 includes a plurality of reinforcing ribs 63 and 65 as described above to form the above-mentioned a plurality of load paths LP. The plurality of reinforcing ribs 63 and 65 include a plurality of first reinforcing ribs 63 and a plurality of second reinforcing ribs 65.

The plurality of first reinforcing ribs 63 extend along the front and rear direction of the vehicle body. The plurality of second reinforcing ribs 65 extend in the up and down direction of the vehicle body to connect the plurality of first reinforcing ribs 63 to each other.

In various exemplary embodiments of the present disclosure, the front coupling portion 37 is configured to mount the front back beam unit 3 and the front end module (FEM) carrier thereon. The front coupling portion 37 is integrally connected to the front portion of the rib reinforcing portion 35.

The front coupling portion 37 has a front surface formed as a flat surface, and a rear surface to which the front end portion of each of the front side members 10 is coupled. The front coupling portion 37 may be coupled to a front upper end portion of each of the front side members 10 through a first mounting bracket 71 (see FIG. 3 and FIG. 4). The front coupling portion 37 may be coupled to a front internal end portion of each of the front side members 10 through a second mounting bracket 72 (see FIG. 3 and FIG. 4).

Figure 13:
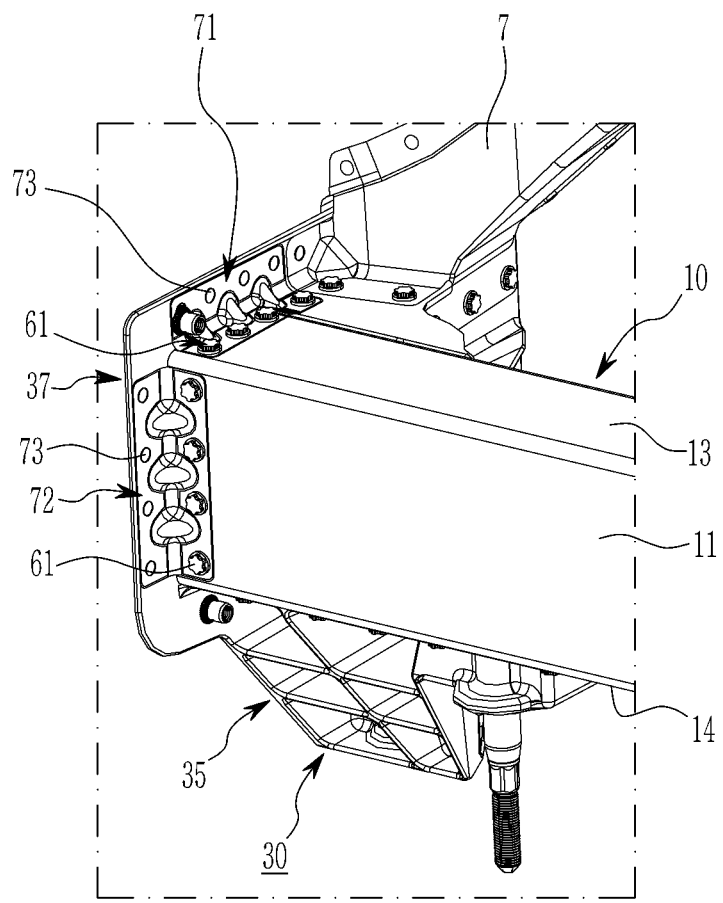
FIG. 13 is a view exemplarily illustrating a fastening structure between a front coupling portion and each of the front side members applied to the front body structure according to various exemplary embodiments of the present disclosure.

As illustrated in FIG. 13, the first mounting bracket 71 may be provided as an 'L'-shaped panel of a steel material as an example. The first mounting bracket 71 may be coupled to a rear surface of the front coupling portion 37 along the width direction of the vehicle body by a plurality of self piercing rivets (SPRs) 73. Also, the first mounting bracket 71 may be coupled to the upper surface 13 of each of the front side members 10 along the width direction of the vehicle body by a plurality of screws 61.

The second mounting bracket 72 may be provided as an 'L'-shaped panel of a steel material as an example. The second mounting bracket 72 may be coupled to the rear surface of the front coupling portion 37 along the up and down direction of the vehicle body by a plurality of SPRs 73. Also, the second mounting bracket 72 may be coupled to the internal side surface 11 of each of the front side members 10 along the up and down direction of the vehicle body by a plurality of screws 61.

Figure 14:
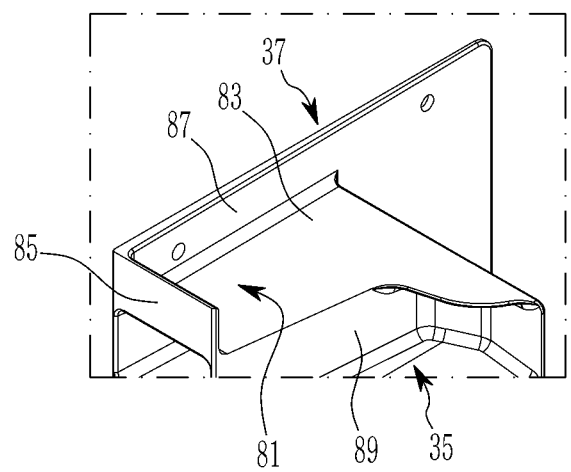
FIG. 14 is a view exemplarily illustrating a member mounting portion applied to the front body structure according to various exemplary embodiments of the present disclosure.

Meanwhile, as illustrated in FIG. 14, a member mounting portion 81 is provided in upper portions of the rib reinforcing portion 35 and the front coupling portion 37 connected to each other as described above. The member mounting portion 81 is configured to couple a front portion of the fender apron upper member 7 (hereinafter, see FIG. 1, FIG. 2, FIG. 3, and FIG. 4) thereto.

The member mounting portion 81 includes a member mounting surface 83, a first coupling flange 85, a second coupling flange 87, and a rib surface 89.

The member mounting surface 83 is provided at the upper portion of the rib reinforcing portion 35. The member mounting surface 83 may be an upper surface of the rib reinforcing portion 35. The first coupling flange 85 extends upwardly from an external edge portion of the member mounting surface 83 in the width direction of the vehicle body. The second coupling flange 87 is provided at the upper portion of the front coupling portion 37 and connected to a front edge portion of the member mounting surface 83. Also, the rib surface 89 extends downwardly from a rear edge portion of the member mounting surface 83.

Figure 15A:
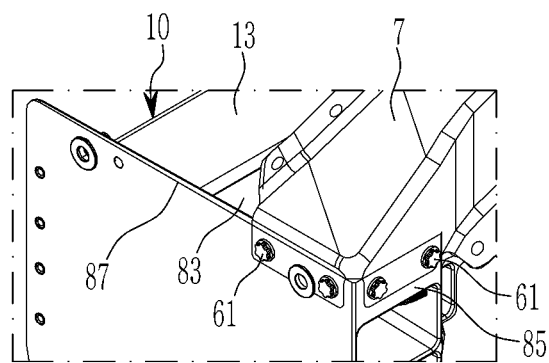
FIG. 15A, FIG. 15B and FIG. 15C are views exemplarily illustrating a fastening structure between the member mounting portion and a fender apron upper member applied to the front body structure according to various exemplary embodiments of the present disclosure.
Figure 15B:
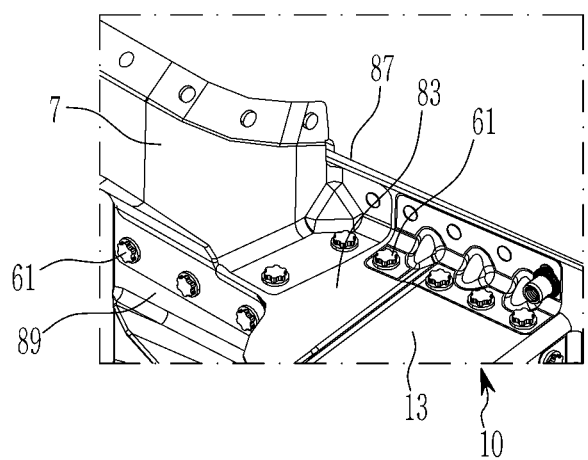
Figure 15C:
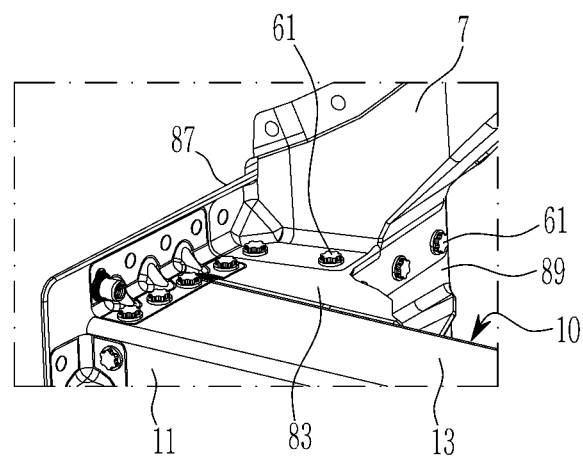

Here, as illustrated in FIG. 15, the front portion of the fender apron upper member 7 may be coupled to each of the member mounting surface 83, the first coupling flange 85, the second coupling flange 87, and the rib surface 89 by a plurality of screws 61.

In various exemplary embodiments of the present disclosure, the first fastening portion 43 is configured to fasten a partial section of the front portion of the sub-frame 5 to a lower side of the rear coupling portion 33. The first fastening portion 43 includes a second box body 91 and a first pipe nut 93.

The second box body 91 is integrally formed on the lower surface 49 of the first coupling rib portion 39 and extends vertically. A third box space 95 open on the second coupling rib portion 41 side is formed inside the second box body 91. The third box space 95 may be formed as a rectangular box space.

The first pipe nut 93 is integrally formed at the second box body 91. The first pipe nut 93 is provided in the third box space 95 along the up and down direction of the vehicle body. A fastening bolt of a steel material configured for fastening a partial section of the front portion of the sub-frame 5 to the lower side of the rear coupling portion 33 may be coupled to the first pipe nut 93.

Furthermore, the first fastening portion 43 may include at least one second internal rib 96 integrally formed at the second box body 91 and vertically connected to the lower surface 49 of the first coupling rib portion 39 in the third box space 95. The second internal rib 96 is provided along the width direction of the vehicle body to reinforce the rigidity of the first fastening portion 43.

In various exemplary embodiments of the present disclosure, the second fastening portion 45 is configured to fasten the other section of the front portion of the sub-frame 5 to a lower portion of the rib reinforcing portion 35. The second fastening portion 45 is provided at a position lower than the first coupling rib portion 39 and integrally formed in the lower portion of the rib reinforcing portion 35. The second fastening portion 45 includes a second pipe nut 97 integrally formed on the lower surface 36 of the rib reinforcing portion 35.

The second pipe nut 97 is connected to any one of the plurality of first reinforcing ribs 63 in the lower portion of the rib reinforcing portion 35 and is provided along the up and down direction of the vehicle body. A mounting bolt 98 (see FIG. 1, FIG. 2, FIG. 3, and FIG. 4) of a steel material configured for fastening the other section of the front portion of the sub-frame 5 to the lower portion of the rib reinforcing portion 35 is insert-coupled into the second pipe nut 97. Alternatively, the mounting bolt 98 may be screw-coupled to the second pipe nut 97. A fastening nut of a steel material may be fastened to the mounting bolt 98.

Here, a virtual vertical center line L2 of the rib reinforcing portion 35 along an up and down direction of the second pipe nut 97 may be provided to be offset at an outward position in the width direction of the vehicle body with respect to a virtual vertical center line L1 of the front coupling portion 37 (see FIG. 10).

With the present structure, a front collision load input from the front of the vehicle through the front back beam unit 3 may be easily transmitted to each of the front side members 10 along the front and rear direction of the vehicle body.

Meanwhile, a plurality of third pipe nuts 99 (see FIG. 3 and FIG. 4) of a steel material is insert-coupled to the front coupling portion 37 described above to fasten the front back beam unit 3 thereto. Here, the term 'insert-couple" may be defined as integrating a steel-material component into an aluminum material in an aluminum die casting method well known to those skilled in the art.

The mounting bolt 98 and the plurality of third pipe nuts 99 as described above are not necessarily limited to being insert-coupled, and may be coupled by welding.

Hereinafter, the operation of the front body structure 100 according to various exemplary embodiments of the present disclosure configured as described above will be described in detail with reference to FIGS. 1 to 15.

First, the front side members 10 are provided as aluminum extrusion members 21, respectively. The mounting unit 30 is provided as an aluminum die casting member 31 corresponding to each of the front side members 10.

The first box body 51 of the rear coupling portion 33 of the mounting unit 30 is inserted into the insertion hole 15 of the external side surface 12 of each of the front side members 10 inwardly in the width direction of the vehicle body, and is provided on the center side of the inside of each of the front side members 10.

In the instant case, the first coupling rib portion 39 of the mounting unit 30 is in tight contact with the lower surface 14 of each of the front side members 10, and the second coupling rib portion 41 is in tight contact with the external side surface 12 of each of the front side members 10. Also, the front end portion of each of the front side members 10 is in tight contact with the rear surface of the front coupling portion 37 of the mounting unit 30 corresponding to the first box body 51. Furthermore, the rib reinforcing portion 35 of the mounting unit 30 is provided outwardly in the width direction of the vehicle body to be offset by the rear coupling portion 33 with respect to the center of the inside of each of the front side members 10.

In the present state, the first coupling rib portion 39 is screw-coupled to the lower surface 14 of each of the front side members 10 by the plurality of screws 61. The second coupling rib portion 41 is screw-coupled to the external side surface 12 of each of the front side members 10 by the plurality of screws 61. Also, the first box body 51 is screw-coupled to the internal side surface 11 of each of the front side members 10 by the plurality of screws 61.

Next, the front coupling portion 37 is coupled to the front upper end portion of each of the front side members 10 through the first mounting bracket 71. Also, the front coupling portion 37 is coupled to the front internal end portion of each of the front side members 10 through the second mounting bracket 72.

Here, the first mounting bracket 71 is coupled to the rear surface of the front coupling portion 37 along the width direction of the vehicle body by the plurality of SPRs 73, and coupled to the upper surface 13 of each of the front side members 10 along the width direction of the vehicle body by the plurality of screws 61. Also, the second mounting bracket 72 is coupled to the rear surface of the front coupling portion 37 along the up and down direction of the vehicle body by the plurality of SPRs 73, and coupled to the internal side surface 11 of each of the front side members 10 along the up and down direction of the vehicle body by the plurality of screws 61.

Accordingly, the connectivity between the front coupling portion 37 and each of the front side members 10 may be further improved by the first mounting bracket 71 and the second mounting bracket 72.

The front portion of the fender apron upper member 7 connected to each of the front side members 10 is coupled to the member mounting portion 81 of the mounting unit 30. The front portion of the fender apron upper member 7 is coupled to the member mounting surface 83, the first coupling flange 85, the second coupling flange 87, and the rib surface 89 of the member mounting portion 81 by the plurality of screws 61.

In the state where the mounting unit 30 is coupled to the front portion of each of the front side members 10 and the front portion of the fender apron upper member 7 is connected to the mounting unit 30 as described above, the front back beam unit 3 is coupled to the front surface of the front coupling portion 37. The front back beam unit 3 is fastened to the plurality of third pipe nuts 99 provided in the front coupling portion 37. Furthermore, the front portion of the sub-frame 5 is fastened to the first fastening portion 43 and the second fastening portion 45 of the mounting unit 30.

The front body structure 100 according to various exemplary embodiments of the present disclosure assembled as described above is configured for effectively supporting the front back beam unit 3 on the front side thereof, each of the front side members 10 on the rear side thereof, the fender apron upper member 7 on the upper side thereof, and the sub-frame 5 on the lower side thereof by the mounting unit 30.

Furthermore, the front body structure 100 according to the exemplary embodiment of the present disclosure may form a plurality of load paths LP transmitting a front collision load input through the front back beam unit 3 to the fender apron upper member 7 and each of the front side members 10 through the front coupling portion 37, the rib reinforcing portion 35, and the rear coupling portion 33.

Accordingly, the front body structure 100 according to various exemplary embodiments of the present disclosure is configured for effectively distributing a collision load by the mounting unit 30 when a collision occurs in front of the vehicle, improving the front crashworthiness of the vehicle.

Furthermore, because the rib reinforcing portion 35 is provided to be offset with respect to each of the front side members 10, the front body structure 100 according to various exemplary embodiments of the present disclosure is advantageous in transmitting a collision load, and is configured for improving a collision load distributing ability.

Furthermore, in the front body structure 100 according to various exemplary embodiments of the present disclosure, the rear coupling portion 33 is inserted into each of the front side members 10, and the first coupling rib portion 39 and the second coupling rib portion 41, which integrally connect the rear coupling portion 33, the rib reinforcing portion 35, the front coupling portion 37, and the first fastening portion 43 to each other, are fastened to each of the front side members 10.

Accordingly, the front body structure 100 according to various exemplary embodiments of the present disclosure is configured for increasing the coupling strength of the sub-frame 5 mounted on the first fastening portion 43 and the second fastening portion 45 integrally formed in the rib reinforcing portion 35.

Meanwhile, because each of the front side members 10 is made of an aluminum extrusion material and the mounting unit 30 is made of an aluminum die casting material, the front body structure 100 according to the exemplary embodiment of the present disclosure is capable of reducing a weight and manufacturing cost of the vehicle.

Furthermore, by connecting each of the front side members 10 and the mounting unit 30 to each other by a plurality of coupling surfaces, the front body structure 100 according to various exemplary embodiments of the present disclosure is configured for increasing coupling strength at the connection sections and increasing the strength of the vehicle body.

Furthermore, because the plurality of reinforcing ribs 63 and 65 are formed in the rib reinforcing portion 35, any separate connecting parts for structural reinforcement are not required. Therefore, the front body structure 100 according to various exemplary embodiments of the present disclosure is configured for reducing the number of parts, a weight, and a manufacturing cost.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A front body structure of a vehicle for mounting front structure parts including a front back beam unit, a sub-frame, and a fender apron upper member thereon, the front body structure comprising:
   front side members provided on left and right sides, respectively, in a width direction of a vehicle body while extending in a longitudinal direction of the vehicle body, each front side member being manufactured of an aluminum extrusion member; and
   mounting units coupled to front portions of the front side members, respectively, to mount the front structure parts thereon, each mounting unit being made of an aluminum material,
   wherein the mounting units form a plurality of load paths connected to the front side members through a plurality of reinforcing ribs outside the front side members, and
   wherein each of the mounting units includes a rear coupling portion connected to a rear portion of a rib reinforcing portion, and inserted and coupled into an external side surface of each of the front side members at the front portions of the front side members inwardly in the width direction of the vehicle body.

2. The front body structure of claim 1, wherein each of the mounting units further includes:
   the rib reinforcing portion including the plurality of reinforcing ribs; and
   a front coupling portion integrally formed on a front portion of the rib reinforcing portion and coupled to a front end portion of each of the front side members.

3. The front body structure of claim 2, wherein each of the mounting units further includes:
   a first coupling rib portion formed in a horizontal direction to integrally connect the rear coupling portion, the rib reinforcing portion, and the front coupling portion to one another along the longitudinal direction of the vehicle body; and
   a second coupling rib portion extending upwardly from the first coupling rib portion to integrally connect the rear coupling portion and the rib reinforcing portion corresponding to each other along the longitudinal direction of the vehicle body.

4. The front body structure of claim 3, wherein each of the mounting units further includes:
   a first fastening portion formed on a lower surface of the first coupling rib portion to fasten the sub-frame thereto; and at least one second fastening portion formed on a lower surface of the rib reinforcing portion to fasten the sub-frame thereto at a more outward position than the first fastening portion.

5. The front body structure of claim 3,
wherein the rear coupling portion includes at least one first box body formed in a shape of a box extending inwardly in the width direction of the vehicle body from the second coupling rib portion.

6. The front body structure of claim 5,
wherein the at least one first box body is inserted into an insertion hole formed in the external side surface of each of the front side members, and provided on a central side of the inside of each of the front side members, and
wherein a first box space open on a side of the second coupling rib portion is formed inside the at least one first box body.

7. The front body structure of claim 6, further including:
a second box body integrally formed on a lower surface of the first coupling rib portion and extends vertically,
wherein a third box space open on a side of the second coupling rib portion is formed inside the second box body.

8. The front body structure of claim 7, wherein a first pipe nut is integrally formed in the third box space of the second box body along an up and down direction of the vehicle body.

9. The front body structure of claim 6, further including:
a connection box body integrally connecting a lower surface of the at least one first box body and an upper surface of the first coupling rib portion.

10. The front body structure of claim 9, wherein a second box space is formed inside the connection box body and connected to the first box space.

11. The front body structure of claim 5,
wherein the first coupling rib portion is screw-coupled to a lower surface of each of the front side members,
wherein the second coupling rib portion is screw-coupled to the external side surface of each of the front side members, and
wherein the at least one first box body is screw-coupled to an internal side surface of each of the front side members.

12. The front body structure of claim 2, wherein the rib reinforcing portion is provided outwardly in the width direction of the vehicle body to be offset with respect to the center of the inside of each of the front side members.

13. The front body structure of claim 2, wherein the plurality of reinforcing ribs include:
a plurality of first reinforcing ribs extending along the longitudinal direction of the vehicle body; and
a plurality of second reinforcing ribs extending in an up and down direction of the vehicle body to connect the plurality of first reinforcing ribs to each other.

14. A front body structure of a vehicle for mounting front structure parts including a front back beam unit, a sub-frame, and a fender apron upper member thereon, the front body structure comprising:
front side members provided on left and right sides, respectively, in a width direction of a vehicle body while extending in a longitudinal direction of the vehicle body, each front side member being manufactured of an aluminum extrusion member; and
mounting units coupled to front portions of the front side members, respectively, to mount the front structure parts thereon, each mounting unit being made of an aluminum material,
wherein the mounting units form a plurality of load paths connected to the front side members through a plurality of reinforcing ribs outside the front side members,
wherein each of the mounting units includes:
a rib reinforcing portion including the plurality of reinforcing ribs; and
a front coupling portion integrally formed on a front portion of the rib reinforcing portion and coupled to a front end portion of each of the front side members,
wherein a member mounting portion configured to couple a front portion of the fender apron upper member thereto is provided in upper portions of the rib reinforcing portion and the front coupling portion connected to each other, and
wherein the member mounting portion includes:
a member mounting surface provided at the upper portion of the rib reinforcing portion;
a first coupling flange extending upwardly from an external edge portion of the member mounting surface in the width direction of the vehicle body;
a second coupling flange provided at the upper portion of the front coupling portion and connected to a front edge portion of the member mounting surface; and
a rib surface extending downwardly from a rear edge portion of the member mounting surface.

15. The front body structure of claim 4,
wherein a virtual perpendicular center portion line of the rib reinforcing portion along an up and down direction of the at least one second fastening portion is provided to be offset at an outward position in the width direction of the vehicle body with respect to a virtual vertical center line of the front coupling portion.

16. The front body structure of claim 2,
wherein the front coupling portion is coupled to a front upper end portion of each of the front side members through a first mounting bracket, and coupled to a front internal end portion of each of the front side members through a second mounting bracket.

17. The front body structure of claim 2,
wherein a plurality of pipe nuts are coupled to the front coupling portion to fasten the front back beam unit thereto.

* * * * *